United States Patent [19]

Bélanger et al.

[11] Patent Number: 4,911,995
[45] Date of Patent: Mar. 27, 1990

[54] THIN ELECTRODE SUPPORTED ON ELECTRONICALLY CONDUCTIVE SHEET AND PROCESS OF MANUFACTURE

[75] Inventors: André Bélanger, Sainte-Julie; Michel Gauthier, Laprairie; Michel Robitaille, Sainte-Julie, all of Canada

[73] Assignee: Hydro-Quebec, Montreal, Canada

[21] Appl. No.: 242,119

[22] Filed: Sep. 9, 1988

Related U.S. Application Data

[63] Continuation-in-part of Ser. No. 166,980, Mar. 11, 1988, Pat. No. 4,824,746.

[51] Int. Cl.$^4$ .......................... H01M 6/00; B05D 5/12
[52] U.S. Cl. .................................... 429/192; 429/209; 427/123; 428/418; 428/458; 29/523.5
[58] Field of Search .................... 427/123; 29/623.5; 429/192, 209; 428/418, 458

[56] References Cited

U.S. PATENT DOCUMENTS

| | | | |
|---|---|---|---|
| 4,358,481 | 11/1982 | Wallsten | 427/361 X |
| 4,603,060 | 7/1986 | Mitsuda et al. | 427/115 |
| 4,615,961 | 10/1986 | Park et al. | 29/623.5 X |
| 4,818,643 | 4/1989 | Cook et al. | 429/192 X |
| 4,824,746 | 4/1989 | Belanger et al. | 429/218 |

Primary Examiner—Stephen J. Kalafut
Attorney, Agent, or Firm—Oblon, Spivak, McClelland, Maier & Neustadt

[57] ABSTRACT

Process of manufacturing thin electrodes, supported on a sheet substrate, the electrodes being made from an element selected form lithium, lithium alloy, or doped lithium, whose melting point does not differ from the melting point of lithium by +50° C. and whose thickness is constant, from a roller of the sheet and a source of the element. According to the invention, there is provided a bath of the element in molten state, the sheet is continuously unrolled, a constant quantity of the molten element is continuously applied on one of the two faces of the sheet, so as to produce a film on the sheet, whose thickness is constant and between abouth 0.1 and about 40µ and whose surface is homogeneous and uniform. The process is carried out in such a manner that the molten element is prevented from solidifying while in contact with the sheet, and the solidification of the element on the sheet takes place after formation of the film on the sheet. Electrode made of a sheet coated with a layer of lithium whose thickness is 0.1 to 40µ.

34 Claims, 3 Drawing Sheets

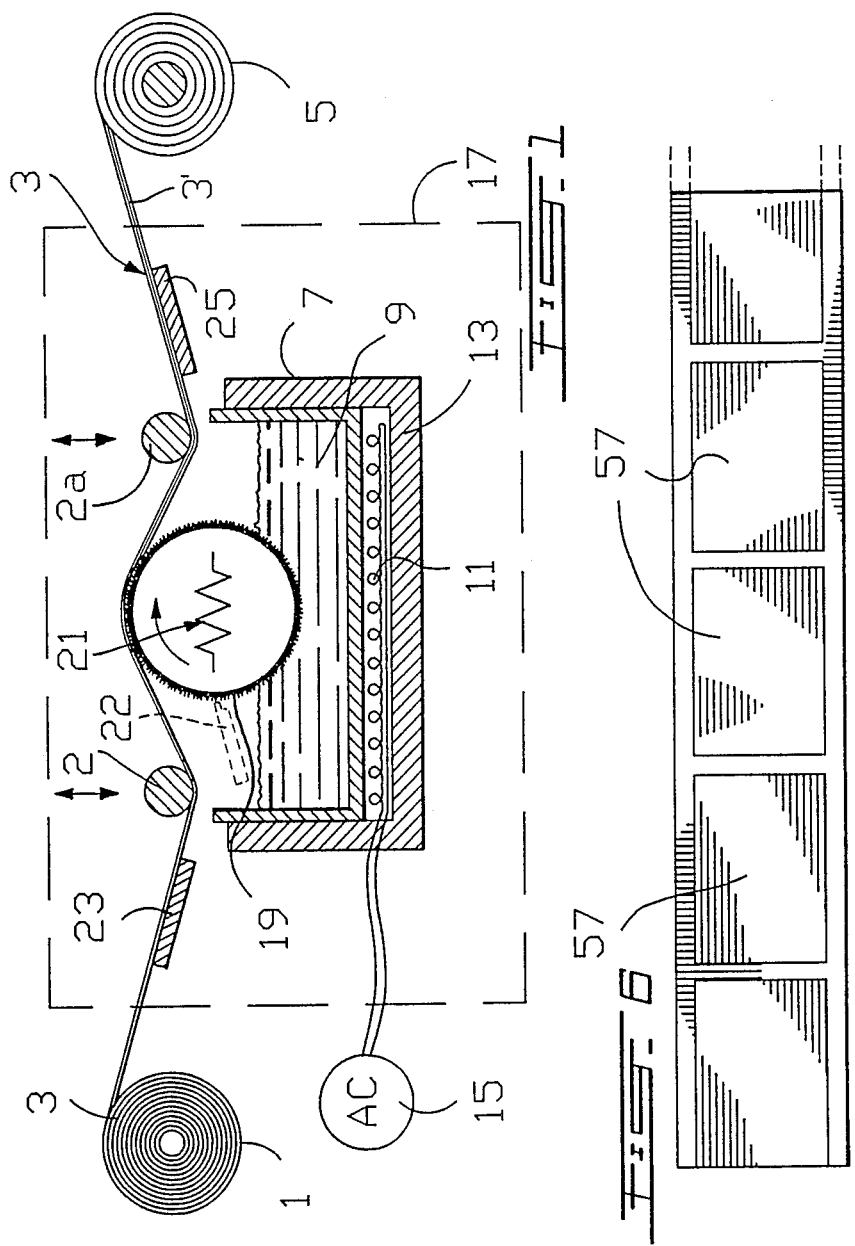

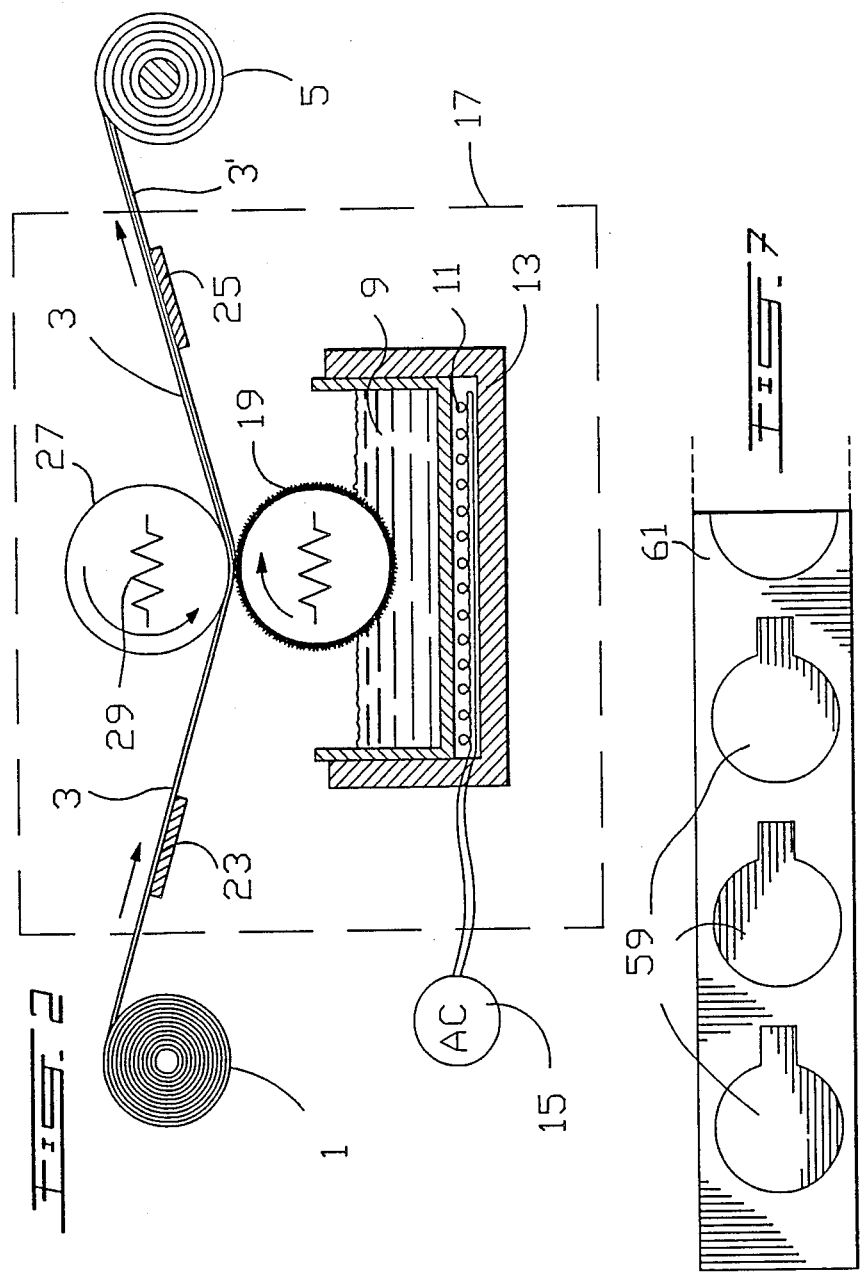

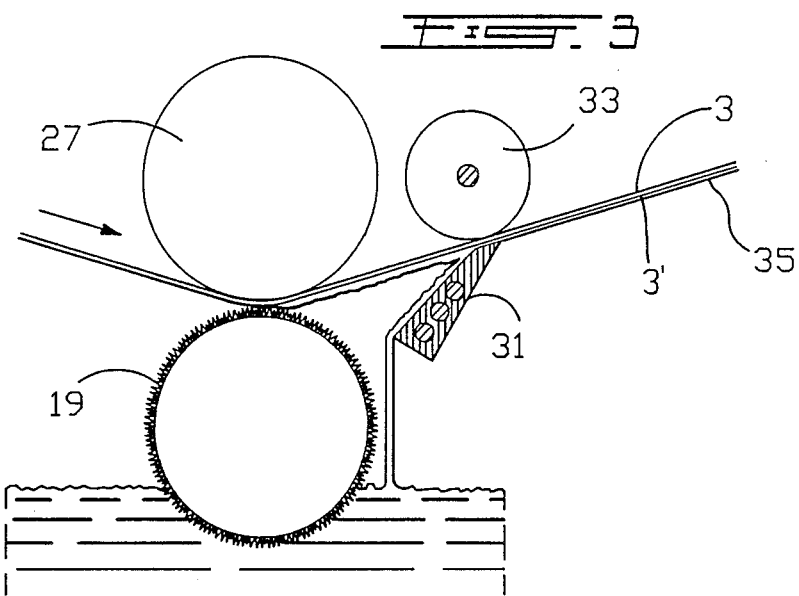
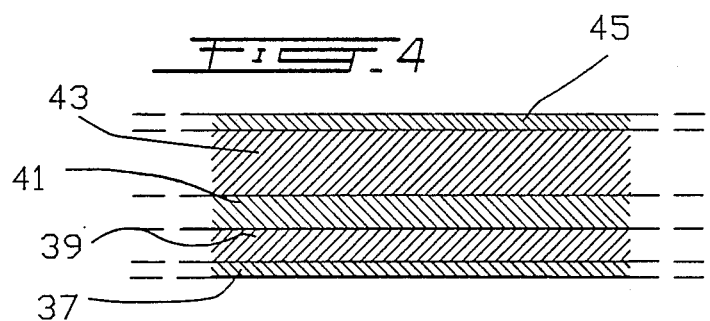
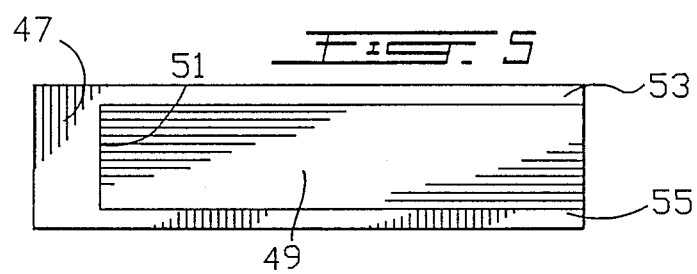

THIN ELECTRODE SUPPORTED ON ELECTRONICALLY CONDUCTIVE SHEET AND PROCESS OF MANUFACTURE

This application is a continuation-in-part of U.S. application Ser. No. 166,980, filed March 11, 1988, now U.S. Pat. No. 4,824,746.

BACKGROUND OF THE INVENTION (1.) Field of the Invention

The present invention relates to thin supported electrodes of lithium and to a process for preparing these electrodes. More specifically, the present invention is concerned with a process for manufacturing thin electrodes of lithium, lithium alloys or doped lithium, which are supported on a substrate in the form of a sheet as well as with the electrodes obtained by this process.

(2.) Description of Prior Art

Since the advent on the market of rechargeable lithium generators (Moli Energy Ltd., Burnaby, B.C. Canada) and the recent emergence of polymer electrolyte, all solid batteries based on the development of lithium generators have evolved very rapidly in the last few years. These new systems all rely on a technology which is based on thin films where current densities are low with the result that they promote a good redepositing and cycling of the lithium electrodes. This tendency has increased the need to produce thinner and thinner lithium electrodes: $\sim 100 \mu$ for liquid-electrolyte batteries and $30 \mu = > \sim 1 \mu$ in the case of polymer electrolytes.

The utilization and handling of thin lithium films are relatively easy when the thickness remains about $100 \mu$. Commercially-produced films are available at a price of the order of US $100 per pound. However, the cost of thinner films increases rapidly since they should then be produced by extrusion followed by lamination; the latter operation is slower and more difficult (high labor cost) with the result that the cost of the lithium produced triples at least. Considering that lithium constitutes a non-negligible portion of the price of the battery, its cost could represent up to 50% of that price. In addition to the higher cost of very thin films ($50 \mu$), the film also becomes difficult to handle because of the high deformability of lithium resulting from its malleability and its adhesiveness to most usual materials. This means that thin lithium films are extremely difficult to handle in continuous processes of assembling batteries made of superposed films: electrode (+)/electrolyte/ lithium electrode.

The technology involved in manufacturing polymer-electrolyte lithium batteries of specific concern in the present invention, is particularly demanding in this respect, since the required thicknesses of lithium, with respect to the characteristics of currently known electrolytes, vary between 30 and about $1 \mu$. Means of overcoming this difficulty are known, such as the utilization of double-sided negative electrodes, which allows to use double the required thickness. (Third International Meeting on Lithium Batteries, May 27 to 30, 1986, Kyoto, Japan, Abstract #ST-11). However, if the intention is to produce bipolar type batteries corresponding to the sequence:

Li/Electrolyte/(+)/Ni/Li/Electrolyte/(+)/Ni/Li . . . (+)/Ni, where nickel is chosen as an example, it becomes necessary to rely on very thin films if an excess of lithium is to be prevented. Excess lithium is in fact detrimental to the cost of the raw material and to the density of stored energy, especially in terms of energy per unit volume; this excess becomes even crucial in the case of batteries designed for room temperature operation, where the quantities of lithium required (1-2 $C/cm^2$) are very low and correspond to thicknesses varying between 1 and 5 $\mu$.

Various processes have been suggested to produce ultra-thin films of lithium, such as when coating a metal collector. This is the case, for example, of lithium deposit by thermal evaporation, by sputtering or by electron beam. However, these techniques are relatively slow and costly, because they are carried out under high vacuum and under conditions of strict cleanliness. Thin films less than $1 \mu$ thick can thus be obtained.

Other processes exist, such as lamination and deposit by transfer on a metallic support, which have been described in U.S. Pat. No. 3,756,789, dated September 4, 1973, Inventor: Alder and U.S. Pat. No. 3,721,113, dated March 1973, Inventor: Hovsepian, or hot coextrusion with a film of plastic material (European patent application Nos. 0 146 241, Part et al., June 26, 1985 and 0 145 498, Cook et al., June 19, 1985). All these processes have serious drawbacks, especially if an attempt is made to apply them to manufacture rechargeable polymer-electrolyte batteries.

On the other hand, there are methods of plating steel sheets by unrolling the latter in a zinc bath. In this connection, reference is made to the following patents:

Japan No. 57-203758, Nippon Steel
Japan No. 57-203759, Nippon Steel
Japan No. 57-203760, Nippon Steel
GB No. 2,080,340, Nippon Steel
Canada No. 1,145,210, Battelle Memorial Institute.

The technology proposed in these patents is obviously not adaptable to the production of a thin layer of lithium on a metallic sheet. Galvanization by means of a roller on one side of a steel sheet according to a Nippon Steel process should also be mentioned (L'Usine Nouvelle, December 1986).

For battery applications, the control of the thickness of the lithium films is much more critical than in the galvanization processes. On the one hand, if the lithium layer is too thin, a portion of the collector could be exposed during discharge, resulting in irreversible or at least serious problems during recharge. It is indeed well known that lithium can be redeposited in a battery a large number of times (more than 500 cycles) as long as the lithium is redeposited on itself and not on a metallic collector, for example nickel. On the other hand, control of the thickness is absolutely necessary in order to prevent the formation of extra thicknesses during the manufacture of complete batteries since extra thickness is penalizing in terms of cost and stored energy. Finally, control of the thickness is necessary in order to ensure a precise balance of the surface capacities ($C/cm^2$) of the electrodes when the batteries are mounted in series; otherwise the capacities of the individual batteries would progress differently during recycling.

The present invention is intended to overcome the above-mentioned difficulties in the use of lithium electrodes and to produce lithium films of various thickness, for example between 40 and about 0.1 $\mu$, rapidly, preferably between about 20 and 1 $\mu$, economically, and in a particularly reproducible manner from one batch to the other.

The present invention also intends to take advantage of the outstanding wetting properties of molten lithium, lithium alloys or doped lithium when used in association with metals such as nickel and copper, and also with other materials, such as plastics which are stable with respect to lithium. More particularly, according to the invention, molten lithium, lithium alloys or doped lithium can be coated on films of solid polymer electrolytes which are used to manufacture lithium batteries.

In the specification and claims, the term substantially stable with respect to lithium when applied to plastics implies that the plastic is not thermodynamically stable with respect to lithium and that it comprises chemical groups susceptible of reacting with lithium, and that under the conditions where molten lithium is deposited and as soon as the normal conditions of use of the battery are achieved, the reaction between lithium and the plastic remains localized at the interface and stops progressing, which explains the term substantially stable or kinetically stable. By way of additional information on this characteristic of lithium to form films blocking any further progression, reference may be had to the Textbook by Dr. Gabano, entitled "Lithium Batteries".

Moreover, in the specification and claims, the term plastic includes all compositions based on thermoplastic or thermosetting materials.

An object of the present invention is to develop a rapid process for producing rolls of lithium spread on a support, preferably metallic or made of other metallized or heat-resistant materials, or of plastics which are substantially stable with respect to lithium, by using the high speed wetting properties of thin sheets of lithium, at thickness between about 1 and 20 $\mu$.

It is another object of the present invention to produce rolls of lithium films of controlled thickness deposited on a support comprising solid polymer electrolytes which are made conductive with $Li^+$ ions.

Another object of the present invention is to benefit from the speed of the process to reduce the time of contact between molten lithium and the support material and to prevent any chemical or thermal attack by the molten lithium.

Another object of the present invention consists in controlling the device used and the unwinding speed of the preferably metallic or plastic sheet so as to allow lithium to undergo thermal treatments. Examples include the control of the rate of solidification (microcrystallinity of lithium), or of the chemical treatments.

Another object of the present invention consists in depositing lithium on plastics which are substantially stable with respect to lithium, so as to provide not only a support for lithium, but also an electrical insulating material for roll-type batteries, the surface of these plastics being metallized in certain cases to improve wetting with lithium.

In this particular case, lithium per se, without any help from an additional metallic collector is responsible for the collection of current.

Another object of the invention resides in a rapid process of depositing a layer of lithium of controlled thickness on a solid polymer electrolyte, which is made conductive with lithium ions, thereby constituting a half-battery. If necessary, a metallic collector can be placed afterwards on the lithium films.

It is another object of the present invention to provide a rapid process for depositing a layer of controlled thickness of lithium on a solid polymer electrolyte, which is made conductive with lithium ions, the electrolyte being part of an electrolyte-positive electrode pre-assembly, thereby constituting a complete battery Li/electrode/positive electrode.

It is another object of the present invention to directly apply a film of controlled thickness of molten lithium on the electrolyte of the battery, in order to eliminate many steps in the process of assembling batteries, such as peeling off plastic supports and transfer of the free lithium surface on the electrolyte of the battery.

Another object of the present invention resides in utilizing a plastic film covered with lithium as an electrical insulating material in batteries produced by rolling, in order to prevent any short-circuit.

Another object of the present invention is to manufacture supported lithium electrodes intended for polymer-electrolyte batteries using molten lithium applied by methods that allow a strict control of the thickness of the lithium deposit.

Another object of the present invention is to ensure thin and reproducible deposits by controlling the thickness and, therefore, the capacity of the lithium layer; on the one hand, this will reduce the excess of lithium and, on the other hand, it will ensure good electrochemical operation during the cycling of the lithium electrode and of the battery.

Another object of the present invention resides in preparing roll-type batteries which is much lighter than when rolling a metallic sheet covered with lithium. On the other hand plastic supports are much more conventional than their metallic equivalents.

SUMMARY OF INVENTION

In a broad sense, the invention relates to a process for manufacturing thin electrodes supported on a substrate in the form of a sheet, which are made from an element selected among lithium, a lithium alloy and doped lithium, whose melting point does not differ from the melting point of lithium by more or less than 50° C., and whose thickness is constant, from a winding of the sheet and a source of said element. According to this process, a bath of the element in the molten state is prepared, the sheet is continuously unwinded, and a constant quantity of the element in molten state, maintained under an inert atmosphere, is applied continuously on at least one of the two faces of the sheet, so as to produce a film on the sheet. The film thickness is constant, between about 0.1 and about 40 $\mu$, and its surface is homogeneous and uniform. Steps must be taken to prevent the molten element from solidifying on contact with the sheet, and to control the solidification of the element on the sheet after a film has been formed thereon. Obviously, the process is also suitable for the production of a collector which is coated with lithium on both sides. For example, the process according to the present invention can be used for applying a coating of lithium, lithium alloy or doped lithium on a sheet already coated, on the side which does not receive the lithium, with positive-electrode material, or even a positive-electrode material covered with an electrolyte.

It goes without saying, as it will be obvious to one skilled in the art that the surfaces to be covered with lithium could have been previously treated so as to promote the adhesion of lithium. Among these treatments, may be mentioned the crown effect, a pre-metallization or the like.

According to a preferred embodiment of the invention, the sheet is made of metal, an alloy, a metallized fiberglass, a metallized or loaded plastic, a plastic which is substantially stable with respect to lithium, selected from electrical insulating materials and solid polymer electrolytes which are made conductive with lithium ions. The preferred metal is copper, nickel, iron or molybdenum. When an alloy is chosen, it is preferably a nickel-, copper- or iron-base alloy; for example, it may be bronze, monel or steel. In practice, a nickel sheet is preferred. The substantially stable electrically insulating materials such as plastics may include polypropylene, polyethylene, polyethers, polysulfones such as Mylar ™ and polyimides such as Kapton ™. Preferably, the electrically insulating material is made of polyether chains, in the form of copolymers, networks comb polymers or the like.

When the sheet is a solid polymer electrolyte, the latter preferably comprises lithium salt containing polyether chains, in the form of copolymers, networks, comb polymers or the like. For example, the sheet can be selected from the group comprising polyoxyethylene, a copolymer of polyoxyethylene and methyl glycidyl ether, and a copolymer of polyoxyethylene and methyl glycidyl ether containing one or more cross-linkable functions. The salts of lithium are preferably selected from the group consisting of $LiClO_4$, $LiCF_3SO_3$, $LiB_{12}H_{12}$, $LiAsF_6$, $LiN(CF_3SO_2)_2$, $LiBF_4$, $LiB\phi_4$.

The solid polymer electrolyte which is intended to be covered with lithium will generally be supported on a plastic sheet which may be peeled off.

The electrolyte may itself be in contact on the other face with a positive electrode to constitute a half-battery.

With respect to the molten element, it may be metallic lithium, or compounds or alloys with a high lithium content whose melting point is close to that of lithium, ±50° C., for example, lithium alloyed or doped with antimony, bismuth, boron, tin, silicon or magnesium.

According to another preferred embodiment of the invention, the bath is maintained at a temperature varying between the melting point of lithium and about 400° C., and the sheet is unrolled above the bath of molten lithium.

According to another preferred embodiment of the invention, an applicator of molten lithium is allowed to circulate continuously in the bath, where it is applied against the face of the sheet, for example nickel, polyether, solid polymer electrolyte, and the like.

The applicator preferably consists of a roller whose axis is parallel to the surface of molten lithium, the base of the roller being immersed in the molten lithium while the upper portion is in contact with the face of the sheet; the surface of the roller is rough allowing the roller to be coated with the molten lithium, alloy or doped lithium, and to transfer the latter, uniformly and at a constant thickness, to the said face of the sheet, such as nickel, polyether, solid polymer electrolyte and the like.

Although this surface roughness can be of any kind, it is preferably constituted by regular geometrical patterns which constitute cavities regularly distributed across the roller surface, which collects the molten material and transfers it onto the sheet.

The sheet is preferably unrolled at a speed which varies between about 0.5 and 100 cm/s. Moreover, depending on circumstances, it is possible to heat the roller in order to prevent the molten pure doped or alloyed lithium, from solidifying before being deposited on the face of the sheet to be covered with lithium.

According to another embodiment of the invention, the sheet undergoes a heat treatment before and/or after the element has been applied on said face.

According to another embodiment of the invention, a scraper is provided for removing any excess molten material from the surface of the roller before the latter is applied to the face of the metallic sheet to be coated.

According to another embodiment of the invention, after the metallic sheet has been coated with molten pure, alloyed or doped lithium, the face is treated with a scraper to smooth out any surface imperfections left by the roller.

Preferably, the lithium bath as well as the sheet, in the vicinity of the lithium bath, are maintained in an inert atmosphere which contains neither oxygen nor water vapor in order to prevent any undesirable reaction.

Obviously, the device described can be modified in order to coat both faces of the metallic collector, if desired, as it will be obvious to anyone skilled in the art.

In another broad sense, the invention concerns a thin electrode supported on a substrate in the form of a sheet, one face of which sheet is at least partially covered with a layer of an element selected among lithium, a lithium alloy and doped lithium, the layer of the element having a uniform thickness varying between about 0.1 and about 40 $\mu$. The surface of the layer is practically free of asperities, and cannot be removed from the sheet by means of a knife.

The sheet substrate can be a metal, an alloy, a metallized fiberglass, a loaded or metallized plastic, a plastic which is substantially stable with respect to lithium selected from electrically insulating materials and solid polymer electrolyte made conductive with Li ions. For example, the metallic sheet can be made of copper, nickel, iron or molybdenum, nickel-, copper-, or iron-base alloys, such as brass, bronze, steel or monel. Preferably, the material of the sheet is nickel. The substrate may also comprise a sheet of aluminized or nickelized polypropylene, a sheet of Kapton ™, a polymer electrolyte containing polyethylene oxide and $LiClO_4$, and the like.

The element which constitutes the coating is preferably metallic lithium. This element may also consist of compounds or alloys with a high lithium content and a melting point close to that of lithium to ±50° C., for example, lithium alloyed or doped with antimony, bismuth, boron, tin, silicon or magnesium.

BRIEF DESCRIPTION OF DRAWINGS

The invention will now be illustrated by means of the annexed drawings which are given by way of example and without any intention to limit the invention thereto.

In the drawings:

FIG. 1 is a schematic illustration of a device allowing the process to be carried out according to the present invention;

FIG. 2 is a schematic illustration of another device allowing the process to be carried out;

FIG. 3 is a schematic illustration of a scraper which can be adapted to the devices of FIGS. 1 and 2;

FIG. 4 is a cross-section of a battery incorporating an anode according to the present invention;

FIG. 5 is a view from above of a substrate covered with a strip of lithium;

FIG. 6 is another view from above of a substrate with a repetitive pattern of lithium; and FIG. 7 is another view from above of a substrate with another repetitive pattern of lithium.

DESCRIPTION OF PREFERRED EMBODIMENTS

The apparatus schematically illustrated in FIG. 1 comprises a spool 1 for feeding a substrate in the form of a sheet 3. To take hold of the sheet once the latter has been treated, there is a receiver spool 5 which allows the sheet to be pulled during the treatment to be described later. The apparatus also comprises a bath 7 intended to hold molten lithium 9. To make sure that the lithium 9 will be maintained in the molten state and will remain at a controlled temperature, a heating element 11 is provided as well as thermal insulation 13. It will be noted that the heating element is connected in conventional manner to an alternating current source 15. Finally, schematically illustrated at 17 is a zone where the bath and the sheet 3 being treated will be maintained under a controlled atmosphere so as to eliminate oxygen, water vapor and other gases which could react with lithium. This zone is completely conventional and forms no part of the invention.

The applicator used to apply a film of molten lithium 3+ on the underside of the sheet 3 comprises a textured roller 19 whose surface pattern, because of its capillarity, allows the lithium to be deposited on the underside of the sheet 3. The textured roller 19 is also provided with conventional heating means 21 for adequately controlling the temperature of the molten lithium on the surface of the roller. In addition, if desired, there could be provided a scraper 22 (illustrated in dotted lines in FIG. 1) enabling any excess of molten material to be removed from the surface of the roller before the latter is applied to the surface 3 of the sheet substrate.

To ensure adequate contact between the sheet and the roller 19, rods 2,2a are provided which are applied against the upper face of the sheet 3 and allow the angle of contact between the sheet 3 and the roller 19 to be adjusted. Before the sheet 3 reaches the zone defined by the molten lithium, there is provided a temperature conditioner 23 for adjusting the temperature of the sheet as it arrives above the bath of molten lithium. Similarly, another temperature conditioner 25 is provided which is adjusted to heat or cool the Li°/sheet couple before the sheet is rolled onto spool 5.

A modification of the apparatus schematically illustrated in FIG. 1 is illustrated in FIG. 2. In this embodiment, where the parts common to those in the apparatus illustrated in FIG. 1 are identified by the same reference numbers, it will be seen that there is provided a roller 27 which allows the sheet 3 to be pulled between rollers 19 and 27. Roller 27 is provided with heating means 29 to ensure an adequate temperature of the sheet when the latter is being treated.

Referring now to FIG. 3, it will be seen that the device illustrated in FIG. 2 can be provided with a scraper 31 for reducing the thickness and/or removing surface imperfections which may have been left by the roller 19. This additional device must be kept sufficiently hot to make sure that the excess material which has been scraped off returns to the bath while still in liquid condition. This is made possible by providing the scraper 31 with conventional heating means (not shown). Moreover, in order that the scraped surface be thoroughly homogeneous, there is provided a rest roll 33 immediately above the scraper 31. The homogeneous surface of the lithium-coated sheet is illustrated at 35.

The heated scraper is particularly useful when significant thicknesses of lithium are deposited, in which case, the pattern of the engraving roller risks leaving marks on the lithium after cooling. The heated scraper 33 can eliminate these surface imperfections.

The product obtained according to the present invention can be used to make a battery as illustrated in FIG. 4. It will be seen that the latter comprises a copper collector 37 whose thickness is about 10 $\mu$. The thickness of the lithium layer 39 obtained by the process according to the invention is about 20 $\mu$. The battery also comprises a polymer electrolyte 41 whose thickness is 20 $\mu$, a positive electrode 43, 40 $\mu$ thick and a copper collector 45, 10 $\mu$ thick, forming a total thickness of 100 $\mu$.

Examples of sheets covered with strips of lithium are illustrated in FIGS. 5, 6 and 7. In FIG. 5, metallic lithium 49 is applied on the metallic sheet 47. The start of the strip is illustrated at 51 while the two uncoated strips are identified by reference numbers 53,55. If it is desired to obtain sheets coated with repeat lithium pattern, an applicator roller 19 can be used whose pattern will serve to produce the repeats 57 as shown in FIG. 6. It should also be mentioned that in the case of FIGS. 5 and 6 the substrate sheet is a metallic sheet 47. Obviously, other patterns can be used in lieu of the one illustrated in FIG. 6, for example, the one illustrated in FIG. 7 at 59, where the substrate sheet is a KAPTON substrate 61.

The invention will now be illustrated by means of the following examples which are given without intention to limit the invention thereto.

EXAMPLE 1

A spool containing a sheet of electrolytic copper (width: 7.6 cm, thickness: 25 $\mu$) was used to prepare lithium electrodes. The device selected was the one illustrated in FIG. 1 enclosed in a glovebox (under an atmosphere of helium), $H_2O<10$ ppm and $O_2<10$ ppm. The sheet was placed as shown in FIG. 1. The unwinding operation, performed by activating the pulling roller was set at a speed of 2 cm/s. The stainless steel applicator roller, 7 cm wide, was placed at the centre of the sheet of copper. The roller diameter is 2.5 cm and its surface pattern has the following characteristics: 200 counts; 24-ohm depth, with a pyramidal design having a volume=5.0, according to the description by INTA ROTO Inc. of Richmond, Virginia. The temperature of the lithium bath is maintained at 260° C. during the test. About 30% of the volume of the roller sits in the liquid. The stainless steel container whose dimensions are 10×5×2 cm contains about 50 cc of "Battery" grade lithium. The conditioning plates (23 and 25) are not used for this test. In this way, about 10 m of lithium coating on copper are produced and wound onto the receptor roller.

The lithium thus obtained has a highly metallic aspect with a surface free from defects (smaller than 0.5 $\mu$). The edges of the lithium on the copper are straight and burrless.

The average thickness of the lithium is 5 $\mu$ and is very regular; the variations are less than 0.5 $\mu$ in all directions.

The amount of lithium used is of the order of 3 cc for a thickness of 5 $\mu$.

It should be noted that to produce larger quantities of lithium in a continuous process, it suffices to regularly add fresh lithium to the container.

EXAMPLE 2

For this example, the same device as in example 1 was used, except that there is used an "inking" roller whose surface pattern is slightly more pronounced: i.e.: 25 counts, 330 ohm in depth, vol=72, the pattern again being pyramidal. The same experimental conditions were used: speed=2 cm/s, bath temperature=260° C. The resulting thickness of the lithium on copper was 8 $\mu$ on average, which, in terms of lithium consumption, corresponds to 7 cc for 10 m, or 14 A.h. of electrical charge. The bath and its immediate surroundings are maintained under helium while the receiving spool is kept under dry air (dew point lower than $-25°$ C. at 70° C.).

EXAMPLE 3

Still using the device of FIG. 1, the sheet unwinding speed was increased by a factor of five (to about 10 cm/s) and the same resulting thickness of lithium was obtained by preheating a nickel sheet (7 cm wide, 8 $\mu$ thick) to 300° C. by means of the temperature conditioner 23 and by heating the "inking" spool to 300° C. while maintaining the temperature of the bath 9 at 260° C. A small helium jet was used at 25 to cool the Li/Ni assembly before it reached the winding spool.

EXAMPLE 4

The lithium produced in Example 1 was used to assemble small batteries (4 cm$^2$). A 4 cm$^2$ disk was punched out of the product obtained in example 1. On this lithium disk was deposited an electrolyte film 75 $\mu$ thick consisting of a mixture of polyethylene oxide and lithium perchlorate in a ratio of 20/1. A positive electrode with a $\overline{\text{Ti}}$S$_2$ base on a nickel collector, having a surface capacitance of 1.5 C/cm$^2$, was placed on this half battery. When the temperature of the battery thus constituted was raised to 80° C., the battery could be recycled more than 100 times without any apparent loss of lithium.

EXAMPLE 5

Using a better conducting electrolyte, for example replacing the polyethylene oxide with a synthetic copolymer such as described in Canadian patent application No. 479,862, of April 23, 1985, which has a thickness of 50 $\mu$, it was possible to reach 50 deep discharges and charges without any appearance of dendrites or other signs of malfunctioning of the lithium electrode.

EXAMPLE 6

By using the lithium electrode prepared in accordance with example 2, another 4-cm$^2$ battery was prepared with a copolymer-base electrolyte but using a positive electrode of V$_6$O$_{13}$ with a higher capacitance: 5 C/cm$^2$. With 10 $\mu$ of lithium (i.e. 7.3 C/cm$^2$), which means about 50% lithium vs the positive electrode, it was possible to obtain 75 deep cycles at 60° C. without any dendritic growth or other phenomenon that could be associated with the malfunctioning of the lithium electrode.

EXAMPLE 7

By means of the thin lithium film prepared as in example 3, a battery of over 50 V was assembled by superposing 17 elementary batteries in series, with a voltage of about 3.5 V per unit.

In this example, the positive electrode was made of MnO$_2$ and the electrolyte has a copolymer base as described above. The main feature of this assembly is the exceptionally small thickness of the battery: less than 1 mm.

EXAMPLE 8

Using the device illustrated in FIG. 2, the following assembly has been prepared in a glove-box under an atmosphere of helium. However, the spool 1 including the thin sheet 3, consists in this case of a thin film of a polymer electrolyte whose composition is the following: PEO (polyethylene oxide)—LiCO$_4$ in weight ratio. O/Li=12/1 evaporated on a polypropylene film=25 $\mu$ thick, from a solution of the electrolyte in acetonitrile, as described in detail in U.S. Pat. No. 4,578,326 which is incorporated herein by reference. This supported electrode is sent towards the roller applicator 19, with the free surface of electrolyte facing the roller 19 coated with molten lithium. In this particular application, it is important to minimize the time of contact between the electrolyte-polymer combination and the roller applicator in order to prevent any deformation of the plastic material or formation of detrimental passivation films. For this purpose, the temperature conditioner is kept at a temperature lower than $-10°$ C. and the feeding speed at more than 30 cm/min. In the same manner, the temperature of the bath of molten lithium is 210° C. i.e. about 30° C. above the melting point of lithium. Roller 27 which controls the pressure and the contact angle of the roller applicator 19 against the polymer, is kept cold at 0° C. With the same roller as the one used in Example 1, 3–4 $\mu$ of lithium of excellent surface quality have been deposited. The electrolyte covered with lithium was thereafter fixed to a conventional composite positive electrode (after peeling off the polypropylene support): TiS$_2$/Shawinigan black/electrolyte of 2 C/cm$^2$, while on the side of lithium, a thin sheet of nickel has been fixed as a current collector. The battery characteristics of this assembly are quite similar to those of other electrodes of lithium on metal collectors previously described above. This battery was cycled 20 times at a rate of C/12 and a temperature of 80° C., which confirms that the process of lithium deposition does not result in the formation of detrimental insulating films on the surface of lithium in contact with the electrolyte.

EXAMPLE 9

The same arrangement as in Example 8 was used except that the support utilized was a sheet of a copolymer of ethylene oxide and methyl glycidyl ether having a EO/MGE ratio of 80/20 and a thickness of 100 microns supported on a sheet of TEFLON TM 20 microns thick. Between 3 and 5 micrometers of lithium were deposited as the temperature of the bath was 205° C. and the unwinding speed of the sheet was 50 cm/min. Mounted against a 4 cm$^2$ TiS$_2$ cathode, this battery has shown an impedance lower than 100$\Omega$ at 60° C. and thereafter an excellent behaviour during cycling.

EXAMPLE 10

There is prepared a membrane which is equivalent to that of the example 9 except that it contains about 5 weight percent of AGE (allyl glycidyl ether). The presence of this cross-linkage group gives to the membrane so prepared better mechanical properties while being more resistant against deformations. It was possible to deposit thereon 7 to 8 microns of lithium which is kept at a temperature of 250° C., and at a speed of 25 cm/min. A cathode of vanadium oxide 4 cm$^2$ containing added Shawinigan black having the same electrolyte as in the membrane mentioned in Example 9, was fixed thereto, and the characterizing voltage of this type of battery was immediately measured; it was found to be 3.4 V. A battery impedance lower than 150 ohms at 20° C. has confirmed that the lithium-electrolyte interface was the same as the one obtained with commercially produced laminated lithium. The battery could be cycled quite normally at discharge rates of C/10 and recharge of C/20 without dendrites and with coulombic yields higher than 95%.

EXAMPLE 11

The membrane obtained as in Example 8 was used except that it did not contain lithium salt; it had a thickness of 100 microns. Molten lithium was deposited on this membrane by means of the device illustrated in FIG. 1 by using an engraving roller having a pyramidal pattern, and whose characteristics are the following: 200 counts; 24 ohms depth and vol.=5.0 as defined in INTA-ROTO INC. of Virginia. By means of this roller at a temperature of 200° C. of the bath of molten lithium and a speed of 30 cm/min. a film of lithium of a consistent thickness of 3 microns without apparent defect, was deposited. When mounted in a battery, the resistance of the Li-electrolyte interface was found to be equivalent to that observed in the case of lithium produced by laminating.

EXAMPLE 12

The same electrolyte as in Example 10 was used except that it has already been pre-assembled to a positive electrode based on vanadium oxide and supported on Cu. This material was rolled into a coil. This half-battery assembly was unrolled towards the application, the electrolyte side facing molten lithium. At a speed of 40 cm/min., 5 microns of lithium, we deposited on a width corresponding to the immediately facing positive electrode.

EXAMPLE 13

Using the device illustrated in FIG. 2, the sheet consisted of a Ni metallized polypropylene (50Ω/square). 10 μ of molten lithium were deposited on the metalized side under the same conditions as in Example 10. Assembled as a battery, the lithium behaved as expected.

EXAMPLE 14

In this particular example a support film of aluminum (10 μ) covered with an electrically insulating varnish (−8 μ) was prepared. The varnish was made of a commercial epoxy resin and serves for example to protect metals for decorative purposes. After cross-linking, the protected aluminum support is dried at 100° C. for a few hours. Then, by the process according to the invention, there is deposited a 5 μ film of lithium under conditions equivalent to those of Example 9. This combination Al/insulating resin/lithium 5 μ is then contacted with a sub-assembly electrolyte/TiS$_2$ electrode (1 Coulomb/cm$^2$)/collector taking care with polypropylene masks to free a portion of the surface of lithium in order to permit current collection of this electrode. The materials and composites of the positive electrode and of the electrolyte are the same as in Example 9. This battery is then cycled at room temperature for more than 150 cycles which clearly establishes the kinetic stability of the plastic coating used under those conditions and the possibility to use low cost supports which are not normally used with lithium even at room temperature. The use of a cross-linkable varnish is not essential and other resistant varnishes can be used for this purpose.

We claim:

1. Process for manufacturing thin electrodes supported on a sheet substrate, said sheet substrate comprising a plastic material which is substantially stable with respect to lithium and is selected from electrically insulating materials and solid polymer electrolytes made conductive with lithium ions, said electrodes being made from an element selected from the group consisting of lithium, lithium alloy and doped lithium, whose melting point does not differ from the melting point of lithium by ±50° C., the thickness of said element being constant, from a roll of said sheet and a source of said element, which comprises providing a bath of said element in molten state and keeping said bath under an inert atmosphere, continuously unwinding said sheet, continuously applying on at least one of the two faces of said sheet, a constant quantity of said element in molten state, so as to produce a film on said sheet whose thickness is constant and between about 0.1 and about 40 μ and whose surface is homogeneous and uniform, preventing the element in molten state from immediately solidifying while in contact with said sheet, and causing a controlled solidification of said element on said sheet after said film has been formed thereon.

2. Process according to claim 1, wherein said sheet substrate comprises an electrically insulating plastic material which is substantially stable with respect to lithium.

3. Process according to claim 1, wherein said plastic material is a thin plastic coating which is substantially stable with respect to lithium and is deposited on a film support which is normally incompatible with lithium such as aluminum and comprising more particularly compositions based on epoxy resins, acrylate resins, sulfone resins and polyamides.

4. Process according to claim 2, wherein said electrically insulating plastic material is selected from the group consisting of a polyethylene, polypropylene, polyester, polyether, polysulfone and polyimide.

5. Process according to claim 2, wherein said electrically insulating plastic comprises polyether chains, in the form of copolymers, networks or comb polymers.

6. Process according to claim 5, wherein the polyether is selected from the group consisting of polyoxyethylene, a copolymer of polyoxyethylene and methyl glycidyl ether, and a copolymer of polyoxyethylene and methyl glycidyl ether containing at least one cross-linkage function.

7. Process according to claim 1, wherein said sheet substrate comprises a solid polymer electrolyte made conductive with lithium ions.

8. Process according to claim 11, wherein said electrolyte comprises lithium salt containing polyether chains, in the form of copolymers, networks or comb polymers.

9. Process according to claim 8, wherein the lithium salt is selected from the group consisting of LiC1O$_4$, LiCF$_3$SO$_3$, LiH$_{12}$B$_{12}$, LiAsF$_6$, LiN(CF$_3$So$_2$)$_2$, LiBF$_4$, LiBφ$_4$.

10. Process according to claim 5, wherein no lithium is present in said electrolyte which lithium is deposited thereon.

11. Process according to claim 5, wherein said polyether is selected from the group consisting of polyoxyethylene, a copolymer of polyoxyethylene and methyl glycidyl ether, and a copolymer of polyoxyethylene and methyl glycidyl ether containing at least one cross-linkage function.

12. Process according to claim 7, wherein said electrolyte is mounted on a plastic support which can be peeled off.

13. Process according to claim 7, wherein said electrolyte is supported on a positive electrode.

14. Process according to claim 1, wherein the element is metallic lithium.

15. Process according to claim 1, wherein the element is an alloy of lithium.

16. Process according to claim 1, wherein the lithium is alloyed or doped with antimony, bismuth, boron, tin, silicon, magnesium.

17. Process according to claim 14, which comprises keeping the bath at a temperature varying between the melting point of lithium and about 400° C.

18. Process according to claim 17, which comprises unwinding the sheet above the bath of molten lithium.

19. Process according to claim 18, which comprises continuously circulating a molten lithium applicator in said bath, and applying said applicator on said face of the sheet.

20. Process according to claim 19, wherein said applicator comprises a roller whose axis is parallel to the surface of molten lithium, the base of the roller being immersed in the molten lithium while the upper portion is in contact with said face, the surface of the roller comprises asperities allowing the roller to be coated with molten lithium so as to uniformly transfer the latter on said face of the sheet.

21. Process according to claim 20, wherein the asperities consist of regular geometrical patterns constituting cavities regularly distributed across the roller surface, said cavities collecting the molten material and transferring same on the sheet.

22. Process according to claim 21, wherein the cavities are gauged as a function of the thickness of the layer of pure lithium, lithium alloy or doped lithium.

23. Process according to claim 22, which comprises unrolling the sheet at a speed between 0.5 and 100 cm/s.

24. Process according to claim 22, which comprises heating the roller in order to prevent the molten lithium from immediately solidifying before being applied against said face of the sheet.

25. Process according to claim 1, which comprises thermally treating said sheet before and after having applied the element in molten state against said face.

26. Process according to claim 24, wherein after having coated the sheet substrate with molten lithium, said face is treated with a scraper thereby reducing the thickness of lithium applied and optionally removing surface imperfections left by the roller.

27. Process according to claim 22, which comprises maintaining the lithium bath as well as the sheet, in the vicinity of said lithium bath, under an inert atmosphere containing neither oxygen nor water vapor.

28. Process according to claim 20, which comprises providing a scraper for removing any excess molten material from the surface of the roller before the latter is applied to the face of the sheet to be coated.

29. Thin supported electrode which comprises a sheet substrate, comprising a plastic material which is substantially stable with respect to lithium and is selected from electrically insulating materials and solid polymer electrolytes made conductive with lithium ions, at least one face of which is at least partially covered with a layer of an element selected from the group consisting of lithium, lithium alloy and doped lithium, the melting point of said element being close to that of lithium to +50° C., the layer of said element having a uniform thickness varying between about 0.1 $\mu$ and about 40 $\mu$, the surface of said layer being substantially free of asperities and cannot be removed from the sheet by means of a knife, whenever produced by the process according to claim 1.

30. Electrode according to claim 29, wherein the element is selected from the alloys of lithium.

31. Electrode according to claim 30, wherein the lithium is alloyed with antimony, bismuth, boron, tin, silicon, magnesium.

32. Half battery comprising an electrolyte disposed on a support which can be peeled off, said electrolyte having been covered with a layer of an element selected from the group consisting of lithium, lithium alloy and doped lithium, the melting point of said element being close to that of lithium to +50° C., the layer of said element having a uniform thickness varying between about 0.1 $\mu$ and about 40 $\mu$, the surface of said layer being substantially free of asperities and cannot be removed from the electrolyte by means of a knife.

33. Electrochemical generator comprising an anode, a cathode as well as an electrolyte wherein the anode is as defined in any one of claims 29, 30 or 31.

34. Electrochemical generator comprising a half battery and a cathode, wherein the half battery is as defined in claim 32.

* * * * *

UNITED STATES PATENT AND TRADEMARK OFFICE
CERTIFICATE OF CORRECTION

PATENT NO. : 4,911,995
DATED : MARCH 27, 1990
INVENTOR(S) : ANDRE BELANGER ET AL.

It is certified that error appears in the above-identified patent and that said Letters Patent is hereby corrected as shown below:

On the title page:

The priority date is missing in the patent. Please insert --Priority date is March 11, 1987 in Canada which bears Serial Number 531,715--.

Signed and Sealed this

Eighth Day of October, 1991

Attest:

HARRY F. MANBECK, JR.

Attesting Officer

Commissioner of Patents and Trademarks